(12) United States Patent
Goto et al.

(10) Patent No.: US 11,773,503 B2
(45) Date of Patent: Oct. 3, 2023

(54) NI-PLATED STEEL SHEET AND METHOD FOR MANUFACTURING NI-PLATED STEEL SHEET

(71) Applicant: NIPPON STEEL CORPORATION, Tokyo (JP)

(72) Inventors: Yasuto Goto, Tokyo (JP); Kiyokazu Ishizuka, Tokyo (JP); Takehiro Takahashi, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 17/777,022

(22) PCT Filed: Dec. 20, 2019

(86) PCT No.: PCT/JP2019/050100
§ 371 (c)(1),
(2) Date: May 14, 2022

(87) PCT Pub. No.: WO2021/100211
PCT Pub. Date: May 27, 2021

(65) Prior Publication Data
US 2022/0403542 A1    Dec. 22, 2022

(51) Int. Cl.
*C25D 5/50*    (2006.01)
*C25D 3/12*    (2006.01)

(52) U.S. Cl.
CPC .............. *C25D 5/50* (2013.01); *C25D 3/12* (2013.01); *Y10T 428/12937* (2015.01)

(58) Field of Classification Search
None
See application file for complete search history.

(56) References Cited

U.S. PATENT DOCUMENTS

| | | | |
|---|---|---|---|
| 6,210,818 B1 * | 4/2001 | Saito | B82Y 25/00 324/252 |
| 2012/0192998 A1 * | 8/2012 | Fukuzawa | B25G 1/102 148/222 |
| 2018/0347061 A1 | 12/2018 | Sadaki et al. | |
| 2018/0351138 A1 | 12/2018 | Asada et al. | |

(Continued)

FOREIGN PATENT DOCUMENTS

| | | | | |
|---|---|---|---|---|
| EP | 3239363 A1 * | 11/2017 | | C21D 6/001 |
| WO | 2017/094919 A1 | 6/2017 | | |

(Continued)

OTHER PUBLICATIONS

Grimmett, et al., "A Comparison of DC and Pulsed Fe—Ni Alloy Deposits", Apr. 1993, J. Electrochem. Soc., vol. 140, pp. 973-978 (Year: 1993).*

(Continued)

*Primary Examiner* — Seth Dumbris
(74) *Attorney, Agent, or Firm* — Renner, Otto, Boisselle & Sklar, LLP

(57) ABSTRACT

A Ni-plated steel sheet includes a base steel sheet and a Ni-based coating layer that is disposed on a surface of the base steel sheet. The Ni-based coating layer includes a Fe—Ni alloy region that is formed on the surface of the base steel sheet. The Fe—Ni alloy region includes a mixed phase composed of a bcc phase and an fcc phase, and a component of the Fe—Ni alloy region includes 5 mass % or more of Fe and a remainder including 90 mass % or more of Ni.

7 Claims, 7 Drawing Sheets

(56) References Cited

U.S. PATENT DOCUMENTS

2018/0366691 A1  12/2018  Sadaki et al.
2021/0025071 A1   1/2021  Saito et al.

FOREIGN PATENT DOCUMENTS

WO    2017/094920 A1    6/2017
WO    2017/094921 A1    6/2017
WO    2019/159794 A1    8/2019

OTHER PUBLICATIONS

Li, et al., "Synthesis and characterization of electrodeposited nanocrystalline nickel-iron alloys", 2003, Materials Science and Engineering A347, pp. 93-100 (Year: 2003).*
Tabakovic et al., "Properties of Ni1-xFex (0.1<x<0.9) and Invar (x=0.64) alloys obtained by electrodeposition", Jun. 2010, Electrochimica Acta, vol. 55, pp. 6749-6754 (Year: 2010).*
Sanaty-Zadeh,A. et al., "Properties of nanocrystalline iron-nickel alloys fabricated by galvano-static electrodeposition", Journal of Alloys and Compounds, May 30, 2009, vol. 485, pp. 402-407.

* cited by examiner

NI-PLATED STEEL SHEET AND METHOD FOR MANUFACTURING NI-PLATED STEEL SHEET

TECHNICAL FIELD OF THE INVENTION

The present invention relates to a Ni-plated steel sheet and a method for manufacturing the Ni-plated steel sheet.

RELATED ART

With the widespread use of portable electronic devices and xEVs (general term for EVs, hybrid vehicles, and plug-in hybrid vehicles), there is a demand for smaller-size and larger-capacity batteries which are power sources for portable electronic devices and xEVs. In order to increase the capacity of the battery, a surface-treated steel sheet constituting a battery container requires sufficiently high strength to ensure the strength of the battery even when it has a small thickness. In addition, in order to reduce the size of the battery, the surface-treated steel sheet constituting the battery container requires machining characteristics such as plastic workability. Further, of course, the steel sheet used as the battery container also requires coating adhesion and corrosion resistance.

For example, the following have been proposed as steel sheets for batteries.

Patent Document 1 discloses a surface-treated steel sheet for a battery container which includes a steel sheet, an iron-nickel diffusion layer that is formed on the steel sheet, and a nickel layer that is formed on the iron-nickel diffusion layer and constitutes the outermost layer. When Fe strength and Ni strength are continuously measured in a depth direction from a surface of the surface-treated steel sheet for a battery container using a radiofrequency glow discharge optical emission spectrometer, the thickness of the iron-nickel diffusion layer, which is a difference (D2–D1) between a depth (D1) at which the Fe strength indicates a first predetermined value and a depth (D2) at which the Ni strength indicates a second predetermined value, is 0.04 to 0.31 μm, and the total amount of nickel included in the iron-nickel diffusion layer and the nickel layer is 4.4 g/m$^2$ or more and is less than 10.8 g/m$^2$.

Patent Document 2 discloses a surface-treated steel sheet for a battery container which includes a steel sheet, an iron-nickel diffusion layer that is formed on the steel sheet, and a nickel layer that is formed on the iron-nickel diffusion layer and constitutes the outermost layer. When Fe strength and Ni strength are continuously measured in a depth direction from a surface of the surface-treated steel sheet for a battery container using a radiofrequency glow discharge optical emission spectrometer, the thickness of the iron-nickel diffusion layer, which is a difference (D2–D1) between a depth (D1) at which the Fe strength indicates a first predetermined value and a depth (D2) at which the Ni strength indicates a second predetermined value, is 0.04 to 0.31 and the total amount of nickel included in the iron-nickel diffusion layer and the nickel layer is 10.8 to 26.7 g/m$^2$.

Patent Document 3 discloses a nickel-plated heat-treated steel sheet for a battery container which includes a nickel layer having a Ni content of 4.4 to 26.7 g/m$^2$ on a steel sheet. When Fe strength and Ni strength are continuously measured in a depth direction from a surface of the nickel-plated heat-treated steel sheet for a battery container using a radiofrequency glow discharge optical emission spectrometer, a difference (D2–D1) between a depth (D1) at which the Fe strength indicates a first predetermined value and a depth (D2) at which the Ni strength indicates a second predetermined value is less than 0.04 μm.

However, even with these techniques, it is not easy to satisfy all of the characteristics required for the steel sheets for batteries in recent years. The inventors considered that it was not possible to sufficiently improve all of the plastic workability, coating adhesion, and corrosion resistance of the Ni-plated steel sheet only by controlling the thickness of the iron-nickel diffusion layer and the Ni coating weight.

PRIOR ART DOCUMENT

Patent Document

[Patent Document 1] PCT International Publication No. WO2017/094919
[Patent Document 2] PCT International Publication No. WO2017/094920
[Patent Document 3] PCT International Publication No. WO2017/094921

DISCLOSURE OF THE INVENTION

Problems to be Solved by the Invention

An object of the invention is to provide a Ni-plated steel sheet that has high plastic workability at the time of manufacturing a battery container and high plating adhesion at the time of processing and a method for manufacturing the same.

Means for Solving the Problem

The gist of the invention is as follows.

(1) According to one aspect of the invention, there is provided a Ni-plated steel sheet including a base steel sheet and a Ni-based coating layer that is disposed on a surface of the base steel sheet. The Ni-based coating layer includes a Fe—Ni alloy region that is formed on the surface of the base steel sheet, the Fe—Ni alloy region includes a mixed phase composed of a bcc phase and an fcc phase, and a component of the Fe—Ni alloy region includes 5 mass % or more of Fe and a remainder including 90 mass % or more of Ni.

(2) In the Ni-plated steel sheet according to (1), the bcc phase may include 0 to 30 atom % of Ni and a remainder including iron and impurities.

(3) In the Ni-plated steel sheet according to (1) or (2), the fcc phase may include 20 to 70 atom % of Fe and a remainder including Ni and impurities.

(4) In the Ni-plated steel sheet according to any one of (1) to (3), the average grain size of crystal grains having the bcc phase may be 10 nm to 1000 nm.

(5) In the Ni-plated steel sheet according to any one of (1) to (4), the Ni coating weight per one surface of the Ni-based coating layer may be 1.5 to 65 g/m$^2$.

(6) In the Ni-plated steel sheet according to any one of (1) to (5), the Fe—Ni alloy region may have a thickness of 0.2 to 1 μm.

(7) According to another aspect of the invention, there is provided a method for manufacturing the Ni-plated steel sheet according to any one (1) to (6). The method includes: plating a base steel sheet with Ni to obtain a base Ni-plated steel sheet; heating the base Ni-plated steel sheet to a soaking temperature range of 650° C. to 850° C.; maintaining the temperature of the base Ni-plated steel sheet in the soaking temperature range for 5 to 120 seconds; and cooling the base Ni-plated steel sheet from the soaking temperature range to 345° C. or lower. In the cooling, the average cooling rate in a temperature range of 650° C. to 560° C. is 2.5 to 11° C./s, and the average cooling rate in a temperature range of 560° C. to 345° C. is 12° C./s or more.

Effects of the Invention

According to the invention, it is possible to provide a Ni-plated steel sheet that has high plastic workability and high plating adhesion at the time of processing and a method for manufacturing the same.

BRIEF DESCRIPTION OF THE DRAWINGS

FIG. 3-1 shows a TEM observation image A in a visual field A of FIG. 2.

FIG. 3-2 shows a TEM observation image B in a visual field B of FIG. 2.

FIG. 4-1b shows an electron beam diffraction image obtained from μ-diffraction measurement of a point b in the TEM observation image A shown in FIG. 3-1.

FIG. 4-2a shows an electron beam diffraction image obtained from the μ-diffraction measurement of the point a in the TEM observation image B shown in FIG. 3-2.

FIG. 4-2b shows an electron beam diffraction image obtained from the μ-diffraction measurement of the point b in the TEM observation image B shown in FIG. 3-2.

FIG. 5-1 is a schematic diagram showing a time-temperature chart indicating an example of manufacturing conditions of a Ni-plated steel sheet 1 according to an embodiment of the invention.

FIG. 5-2 is a schematic diagram showing a time-temperature chart indicating another example of the manufacturing conditions of the Ni-plated steel sheet 1 according to the embodiment of the invention.

EMBODIMENTS OF THE INVENTION

The inventors focused on a crystalline state of an interface between a base steel sheet 11 and a Ni-plated layer as a way to improve the plastic workability and plating adhesion of a Ni-plated steel sheet. Then, the inventors examined the relationship between the above-mentioned characteristics and interface crystal states of steel sheets obtained by applying various alloying treatment conditions to the Ni-plated steel sheet. The results clearly showed that a Ni-plated steel sheet in which a Fe—Ni alloy region 13 included in a Ni-based coating layer 12 included a mixed phase composed of a bcc phase and an fcc phase had extremely high drawing workability, ironing workability, and plating adhesion. A mechanism by which the mixed phase improves these characteristics is not clear at this time. The inventors presume that the mixed phase present between the base steel sheet 11 and the Ni-based coating layer 12 enhances lattice matching between the base steel sheet 11 and the Ni-based coating layer 12 to prevent peeling between the base steel sheet 11 and the Ni-based coating layer 12. In addition, in a case in which the mixed phase is fine particles having an average grain size of 1 μm or less, it is presumed that the mixed phase has high plastic deformability and further improves workability and plating adhesion.

Figure 1:
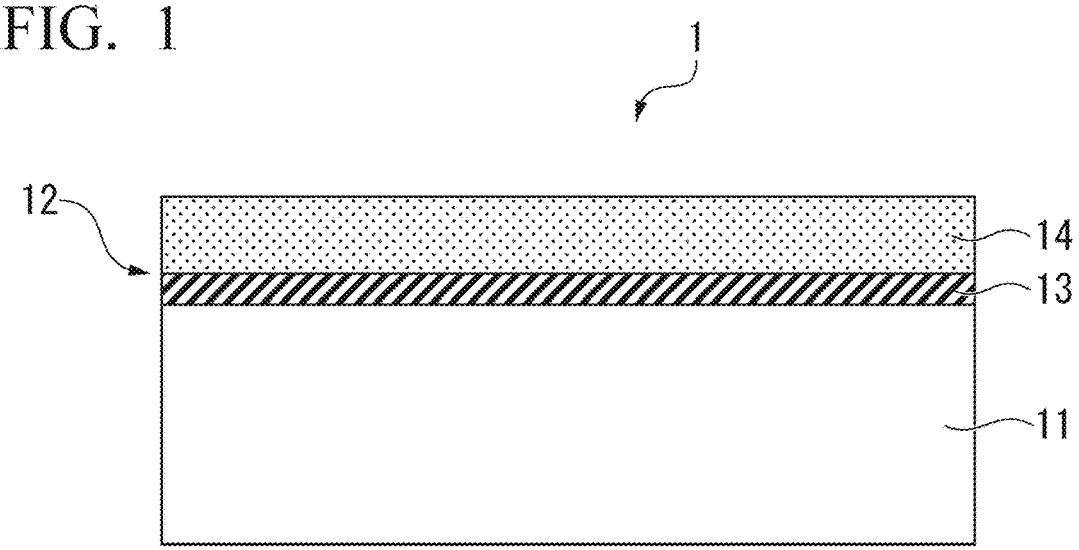
FIG. 1 is a schematic diagram showing a Ni-plated steel sheet according to an embodiment.

As shown in FIG. 1, the Ni-plated steel sheet 1 according to this embodiment obtained on the basis of the above findings includes the base steel sheet 11 and the Ni-based coating layer 12. The Ni-based coating layer 12 includes the Fe—Ni alloy region 13 that is formed on a surface of the base steel sheet 11. The Fe—Ni alloy region 13 includes the mixed phase composed of the bcc phase and the fcc phase. In addition, the Fe—Ni alloy region 13 is manufactured by alloying Ni included in Ni plating that is disposed on the surface of the base steel sheet 11 and Fe included in the base steel sheet 11 using a heat treatment which will be described below. Further, the Ni-based coating layer 12 may include the Fe—Ni alloy region 13 or may further include a Ni region 14. Hereinafter, the Ni-plated steel sheet 1 according to this embodiment will be described in detail.

(Base Steel Sheet 11)

The base steel sheet 11 is a steel sheet that serves as a body of the Ni-plated steel sheet 1. For example, the components, thickness, and metallographic structure of the base steel sheet 11 are not particularly limited. In a case in which the base steel sheet 11 is used as a material for a battery container, for example, the base steel sheet 11 may be made of low carbon aluminum killed steel and interstitial free steel (IF steel)/ultra-low carbon steel), or the like. Furthermore, in a case in which the Ni-plated steel sheet 1 is used as the material for a battery container, the thickness of the base steel sheet 11 may be, for example, 0.15 to 0.8 mm.

(Ni-Based Coating Layer 12)

The Ni-based coating layer 12 is a surface treatment layer which has Ni as a main component and is disposed on the surface of the base steel sheet 11. In this embodiment, the Ni-based coating layer 12 is defined as a layer obtained by alloying a portion or all of the Ni plating disposed on the surface of the base steel sheet 11 with Fe included in the base steel sheet 11. The Ni-based coating layer 12 obtained by alloying a portion of the Ni plating has the Fe—Ni alloy region 13 disposed on the surface of the base steel sheet 11 and the Ni region 14 generated on the Fe—Ni alloy region 13. The entire Ni-based coating layer 12 obtained by alloying all of the Ni plating is the Fe—Ni alloy region 13. The Ni-based coating layer 12 of the Ni-plated steel sheet 1 according to this embodiment may have any configuration.

The average composition, thickness, and the like of the Ni-based coating layer 12 are not particularly limited and can be appropriately set according to the use of the Ni-plated steel sheet 1. Further, the Ni-based coating layer 12 may be disposed only on one surface of the base steel sheet 11 or may be disposed on both surfaces.

For example, the average composition of the Ni-based coating layer 12 may include Ni: 95 to 50 mass %, Fe: 5 to 50 mass %, and impurities. In addition, for example, the Ni-based coating layer 12 may further include alloying elements, such as Co, Sn, Zn, W, Mo, and Cr, in order to improve mechanical properties.

The Ni coating weight per one surface of the Ni-based coating layer 12 may be, for example, 1.5 to 65 g/m². It is preferable that the Ni coating weight in the Ni-based coating layer 12 is 1.5 g/m² or more. In this case, it is possible to reliably ensure, for example, the corrosion resistance of the Ni-plated steel sheet 1. It is preferable that the Ni coating weight in the Ni-based coating layer 12 is 65 g/m² or less. In this case, it is possible to reduce the manufacturing cost of the Ni-plated steel sheet 1. The Ni coating weight per one surface of the Ni-based coating layer 12 may be 2.4 g/m² or more, 4.8 g/m² or more, or 8 g/m² or more. The Ni coating weight per one surface of the Ni-plated steel sheet 1 may be 32 g/m² or less, 24 g/m² or less, or 12 g/m² or less.

The thickness of the Ni-based coating layer 12 is not particularly limited as long as the Fe—Ni alloy region 13 of the Ni-based coating layer 12 includes the mixed phase which will be described below. However, the thickness of the Ni-based coating layer 12 may be defined as 0.2 to 7 µm in order to reliably obtain the effect of improving the corrosion resistance by the Ni-based coating layer 12. It is preferable that the thickness of the Ni-based coating layer 12 is 0.2 µm or more. In this case, it is possible to reliably ensure the corrosion resistance of the Ni-plated steel sheet 1. It is preferable that the thickness of the Ni-based coating layer 12 is 7 µm or less. In this case, it is possible to reduce the manufacturing cost of the Ni-plated steel sheet 1. The thickness of the Ni-based coating layer 12 may be 0.3 µm or more, 0.6 µm or more, or 1 µm or more. The thickness of the Ni-based coating layer 12 may be 4 µm or less, 3 µm or less, or 1.5 µm or less.

The Ni coating weight in the Ni-based coating layer 12 can be measured by, for example, an ICP analysis method. First, the Ni-based coating layer 12 having a predetermined area is dissolved with an acid. Then, the total amount of Ni included in a solution is quantitatively analyzed by ICP. The total amount of Ni quantified by ICP can be divided by the above-described predetermined area to calculate the Ni coating weight per unit area. The average composition of the Ni-based coating layer 12 is also calculated by the ICP analysis method. The thickness of the Ni-based coating layer 12 is calculated by polishing a cross section perpendicular to a rolled surface of the Ni-plated steel sheet 1, taking SEM photographs of arbitrary five points of the cross section, and averaging the thicknesses of the Ni-based coating layer 12 measured in each of the SEM photographs.

(Fe—Ni Alloy Region 13)

The Ni-based coating layer 12 of the Ni-plated steel sheet 1 according to this embodiment includes the Fe—Ni alloy region 13 and the Ni region 14 which is optional. The Fe—Ni alloy region 13 is generally a region that is composed of an alloy of the Ni plating and the base steel sheet 11. In the Ni-plated steel sheet 1 according to this embodiment, a region that includes 5 mass % or more of Fe and a remainder including 90 mass % or more of Ni is defined as the Fe—Ni alloy region 13.

In the Ni-plated steel sheet 1 according to this embodiment, the Fe—Ni alloy region 13 includes the mixed phase composed of the bcc phase and the fcc phase. The bcc phase is alpha iron having a Ni content of 20 atom % or less and/or a Fe—Ni alloy (Kamacite) which includes 20 to 30 atom % of Ni and a remainder including iron and impurities and has a bcc structure. The fcc phase is a Fe—Ni alloy (Taenite) which includes 20 to 70 atom % of Fe and a remainder including Ni and impurities and has an fcc structure. The mixed phase composed of the bcc phase and the fcc phase is a phase in which the bcc phase and the fcc phase are mixed within a predetermined range. When both the bcc phase and the fcc phase are detected in a 1-µm-square region in a portion, which corresponds to the Fe—Ni alloy region 13, in the cross section perpendicular to the rolled surface of the base steel sheet 11, it is determined that the mixed phase is present in the portion. A specific method for specifying the mixed phase will be described below.

As described above, the experiments of the inventors proved that the Ni-plated steel sheet 1 having the Fe—Ni alloy region 13 including the mixed phase composed of the bcc phase and the fcc phase had extremely high drawing workability, ironing workability, and plating adhesion. Therefore, the Ni-plated steel sheet 1 according to this embodiment is defined such that the Fe—Ni alloy region 13 includes the mixed phase composed of the bcc phase and the fcc phase.

The chemical composition of the bcc phase constituting the mixed phase is not particularly limited. However, it is considered that, from a metallurgical point of view, the chemical composition of the bcc phase includes 0 to 30 atom % of Ni and a remainder including iron and impurities. Therefore, the chemical composition of the bcc phase may be defined in this way.

The chemical composition of the fcc phase constituting the mixed phase is not particularly limited. However, it is considered that, from a metallurgical point of view, the chemical composition of the fcc phase includes 20 to 70 atom % of Fe and a remainder including Ni and impurities. Therefore, the chemical composition of the fcc phase may be defined in this way.

The grain size of crystal grains (hereinafter, referred to as "bcc grains" in some cases) having the bcc phase constituting the mixed phase is not particularly limited and can be appropriately changed depending on the use of the Ni-plated steel sheet 1. For example, in a case in which the Ni-plated steel sheet 1 is used as a steel sheet for a battery, it is considered that the average grain size of the bcc grains measured by a method which will be described below is preferably 10 nm to 1000 nm. It is preferable that the average grain size of the bcc grains is 1000 nm or less. In this case, it is possible to further improve the adhesion of the Ni-based coating layer 12 and the workability of the Ni-plated steel sheet 1. From the viewpoint of adhesion and workability, it is not necessary to set the lower limit of the average grain size of the bcc grains. However, it is considered that there is a difficulty in making the average grain size of the bcc grains less than 10 nm, considering the capacity of a manufacturing equipment and the like. Therefore, the average grain size may be defined as 10 nm or more.

Whether or not the Ni-plated steel sheet 1 includes the mixed phase is determined by the following procedure.

(1) Measurement of Thickness of Ni-Based Coating Layer 12

First, the Ni coating weight per one surface of the Ni-plated steel sheet 1 is measured. The Ni coating weight can be calculated by the above-mentioned ICP or a fluorescent X-ray apparatus. Then, the thickness of the Ni-based coating layer 12 is estimated on the basis of the Ni coating weight. The thickness of the Ni-based coating layer 12 estimated by this procedure is almost equal to the depth of the interface between the Ni-based coating layer 12 and the base steel sheet 11. The reason why the thickness and the depth are almost equal to each other is that Fe is included in the Fe—Ni alloy region and the thickness of the Ni-based coating layer is slightly larger than the thickness calculated on the basis of the Ni coating weight by an increase in Fe. However, this procedure makes it possible to estimate the position of the interface between the Ni-based coating layer 12 and the base steel sheet 11.

(2) Estimation of Position of Fe—Ni Alloy Region 13

Figure 2:
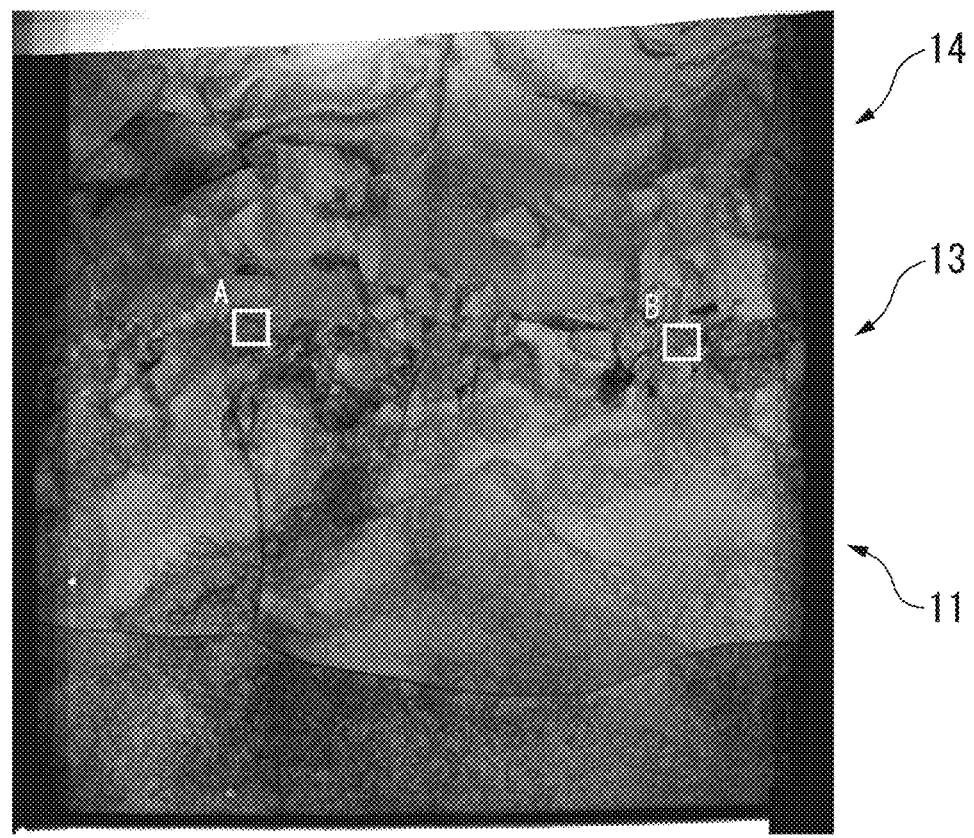
FIG. 2 shows an example of a photograph of a cross section of the Ni-plated steel sheet according to this embodiment.

The Ni-plated steel sheet 1 is cut perpendicularly to the rolled surface, and the obtained cut surface is polished. This cut surface is observed with a low-magnification SEM. An example of an SEM photograph is shown in FIG. 2. As shown in FIG. 2, in the SEM photograph, the base steel sheet 11, the Ni region 14, and the Fe—Ni alloy region 13 (a region composed of fine particles) located therebetween are recognized. In a case in which the Fe—Ni alloy region 13 is not clearly identified, it is possible to estimate the position of the Fe—Ni alloy region 13 on the basis of the thickness of the Ni-based coating layer 12. This is because the Fe—Ni alloy region 13 is present in the vicinity of the interface between the Ni-based coating layer 12 and the base steel sheet 11. Further, element concentration analysis in a depth direction using EPMA or the like may be performed to specify the interface of each of the base steel sheet 11, the Fe—Ni alloy region 13, and the Ni region 14, which will be described below.

(3) Photographing of Fe—Ni Alloy Region 13

A TEM photograph of the Fe—Ni alloy region 13 is taken. The size of the TEM photograph is 1 µm square. The TEM photograph makes it possible to roughly identify the boundaries of the crystal grains in the Fe—Ni alloy region 13.

(4) Specification of Phase of Crystal Grain by µ-Diffraction Measurement

In order to specify the phase of each crystal grain in the Fe—Ni alloy region 13 identified in the TEM photograph, µ-diffraction measurement is performed on each crystal grain. It is determined whether each crystal grain of the Fe—Ni alloy region 13 has the bcc phase or the fcc phase on the basis of a diffraction pattern. In a case in which the bcc phase and the fcc phase are mixed in one visual field of 1 µm square, it can be determined that the mixed phase is formed in the visual field. In a case in which this measurement is performed in five visual fields, when the mixed phase is formed in one or more visual fields, it is determined that the Ni-plated steel sheet 1 to be measured has the Fe—Ni alloy region 13 including the mixed phase of the bcc phase and the fcc phase.

In addition, the phase of the crystal grain in the Fe—Ni alloy region 13 is specified by performing the µ-diffraction measurement on each crystal grain. Therefore, it is difficult to calculate the area ratio of the bcc phase or the area ratio of the fcc phase in the Fe—Ni alloy region 13. Further, a strong correlation was confirmed between the presence or absence of the mixed phase determined by the above-mentioned measurement method and plating adhesion. Therefore, in the Ni-plated steel sheet 1 according to this embodiment, whether or not the mixed phase is present in the Fe—Ni alloy region 13 is determined by the above-mentioned way.

The chemical composition of the bcc phase and the fcc phase can be specified by measuring components of the bcc phase and the fcc phase included in the 5-visual-field TEM photograph used in the specification of the phase of the crystal grain by the above-mentioned µ-diffraction measurement, using EDS or the like. Further, this analysis was performed using the following devices and measurement conditions.

Figures 1, 3:
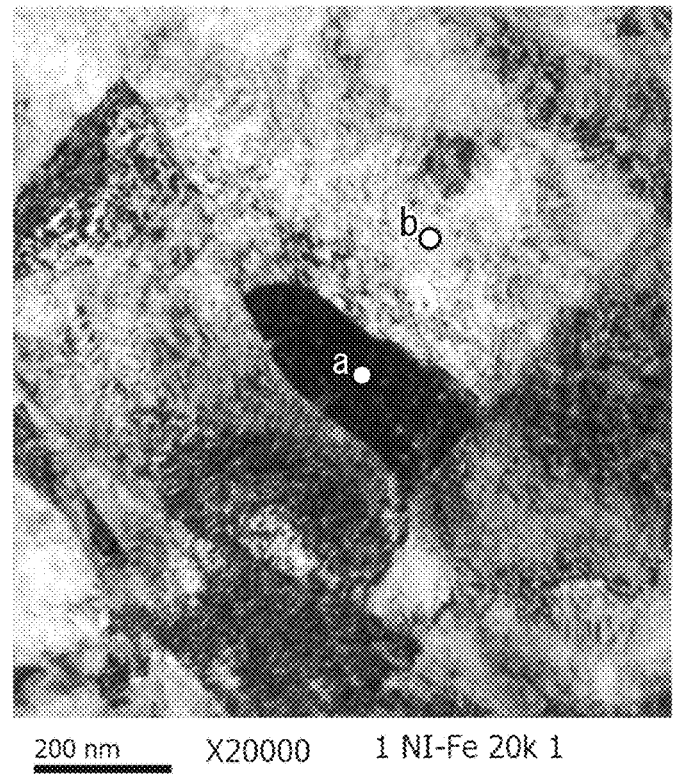
Figures 2, 3:

200-kV field emission transmission electron microscope: JEM-2100F (manufactured by JEOL Ltd.)
  Acceleration voltage: 200 kV
  EDS analyzer: JED-2300T (manufactured by JEOL Ltd.)
  Probe diameter: 2 nm
  Electron diffraction: µ diffraction beam diameter of 10 nm The average grain size of the bcc grains is calculated by the following procedure. The average equivalent circle diameter of α-Fe grains (bcc) and Kamacite included in the Fe—Ni alloy region 13 is calculated using EBSP. It is assumed that a measurement visual field in EBSP analysis is 10×30 µm. In a case in which the base steel sheet 11 is included in this visual field, α-Fe (bcc) grains of the base steel sheet 11 are also detected in the EBSP analysis. The equivalent circle diameter of the α-Fe (bcc) grains in the base steel sheet 11 is usually 2 µm or more. On the other hand, the equivalent circle diameter of Kamacite is usually less than 2 µm. Therefore, the bcc grains having an equivalent circle diameter of 2 µm or more detected by the EBSP analysis are regarded as the α-Fe (bcc) grains in the base steel sheet 11 and are excluded from the analysis target. The average value of the equivalent circle diameters of the obtained α-Fe (bcc) grains and Kamacite included in the Fe—Ni alloy region 13 is regarded as the average grain size of the bcc grains. In addition, here, the method for measuring the average grain size of the bcc grains has been described. However, as shown in FIGS. 3-1 and 3-2, it is presumed from the TEM photographs that the fcc grains having almost the same size as the bcc grains are present.

An example of determining whether or not the mixed phase is present on the basis of the above-mentioned measurement method will be described below.

FIG. 2 shows a photograph of the cross section of the Ni-plated steel sheet 1. The cross section was prepared by an FIB-µ sampling method using NB5000 manufactured by Hitachi High-Technologies Corporation. The thickness of the Ni-based coating layer 12 estimated on the basis of the Ni coating weight was almost equal to the depth from the surface shown in FIG. 2 to the deepest portion of a region composed of fine particles. Then, the region composed of the fine particles shown in FIG. 2 was regarded as the Fe—Ni alloy region 13.

Then, TEM analysis was performed on a visual field A and a visual field B shown in FIG. 2. A 200-kV field emission transmission electron microscope (JEM-2100F manufactured by JEOL Ltd.) was used as a device for analysis. The acceleration voltage at the time of observation was set to 200 kV. The size of the TEM photograph was 1 µm square.

FIG. 3-1 shows a TEM observation image of the visual field A (hereinafter, referred to as a "TEM observation image A"). According to the TEM observation image A, it was possible to roughly identify the boundaries of the crystal grains in the Fe—Ni alloy region 13. It is considered that a dark-colored crystal grain and a light-colored crystal grain in the TEM observation image A are likely to have different crystal structures or are likely to have different crystal orientations even when they have the same crystal structure. Therefore, crystal structure analysis by µ-diffraction measurement was performed on points a and b in the visual field A, considering that the crystal grains are likely to have different crystal structures. The beam diameter was about 10 nm. Further, component analysis by EDS was also performed on the points a and b in the visual field A. An EDS analyzer was JED-2300T manufactured by JEOL Ltd., and a probe diameter was about 2 nm.

Figures 1A, 4:
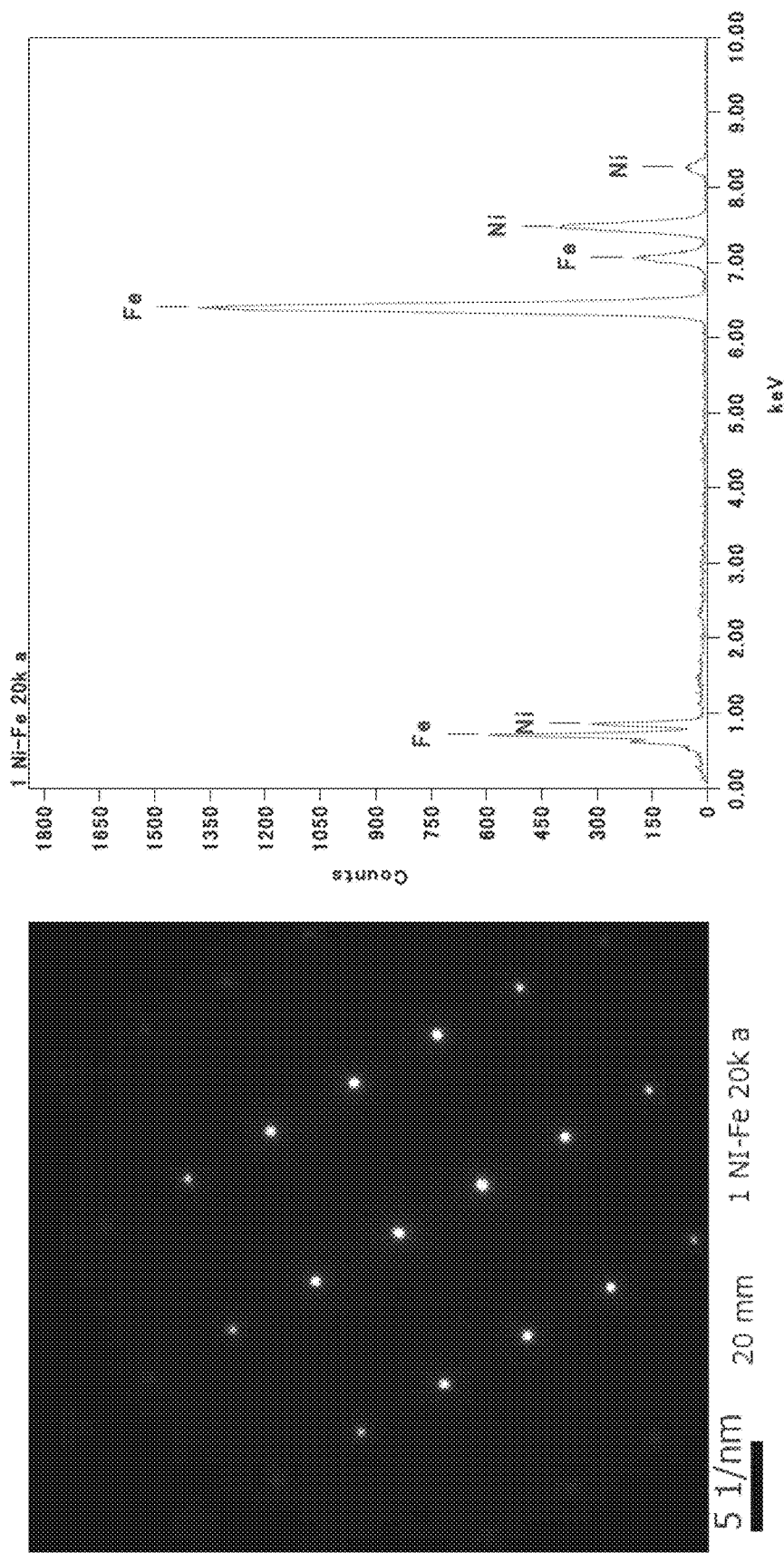
FIG. 4-1a shows an electron beam diffraction image obtained from μ-diffraction measurement of a point a in the TEM observation image A shown in FIG. 3-1.

FIG. 4-1a shows the µ-diffraction measurement results and the EDS analysis results of the point a in the visual field A. The EDS analysis results show that the point a in the visual field A includes about 75 atom % of Fe and about 25 atom % of Ni. Further, the µ-diffraction measurement results show that the point a in the visual field A has the bcc structure. Therefore, it was determined that the point a in the visual field A was Kamacite.

Figures 1B, 4:
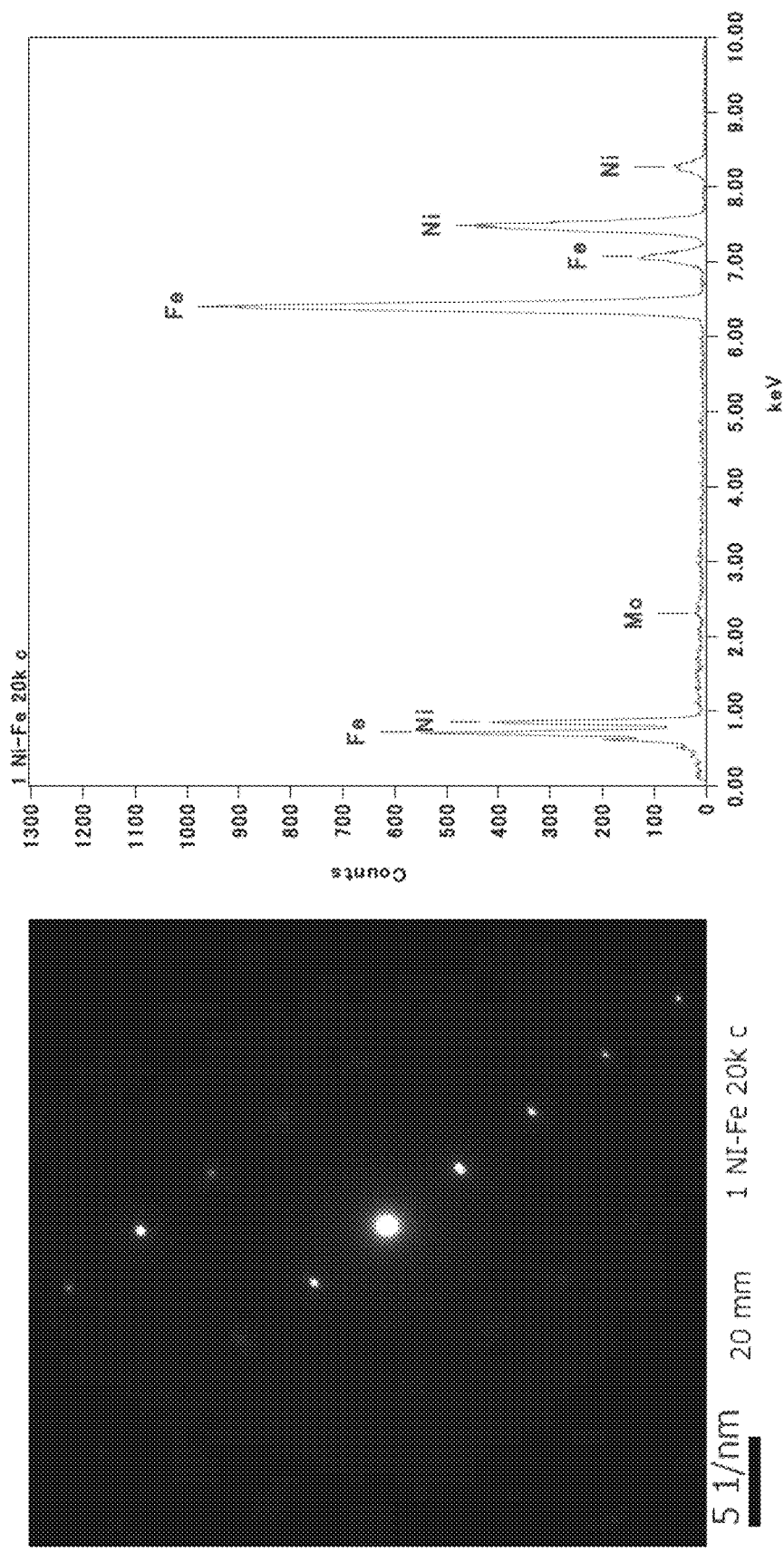

FIG. 4-1b shows the µ-diffraction measurement results and the EDS analysis results of the point b in the visual field A. The EDS analysis results show that the point b in the visual field A includes about 64 atom % of Fe and about 36 atom % of Ni. Further, the µ-diffraction measurement results show that the point b in the visual field A has the fcc structure. Therefore, it was determined that the point b in the visual field A was Taenite. It was determined that the visual field A included the mixed phase on the basis of the measurement results.

FIG. 3-2 shows a TEM observation image of the visual field B (hereinafter, referred to as a "TEM observation image B"). Crystal structure analysis by μ-diffraction measurement and component analysis by EDS were performed on the points a and b of the TEM observation image B. The analyzer and analysis conditions were the same as the analyzer and the analysis conditions for the visual field A (FIG. 3-1).

Figures 2A, 4:
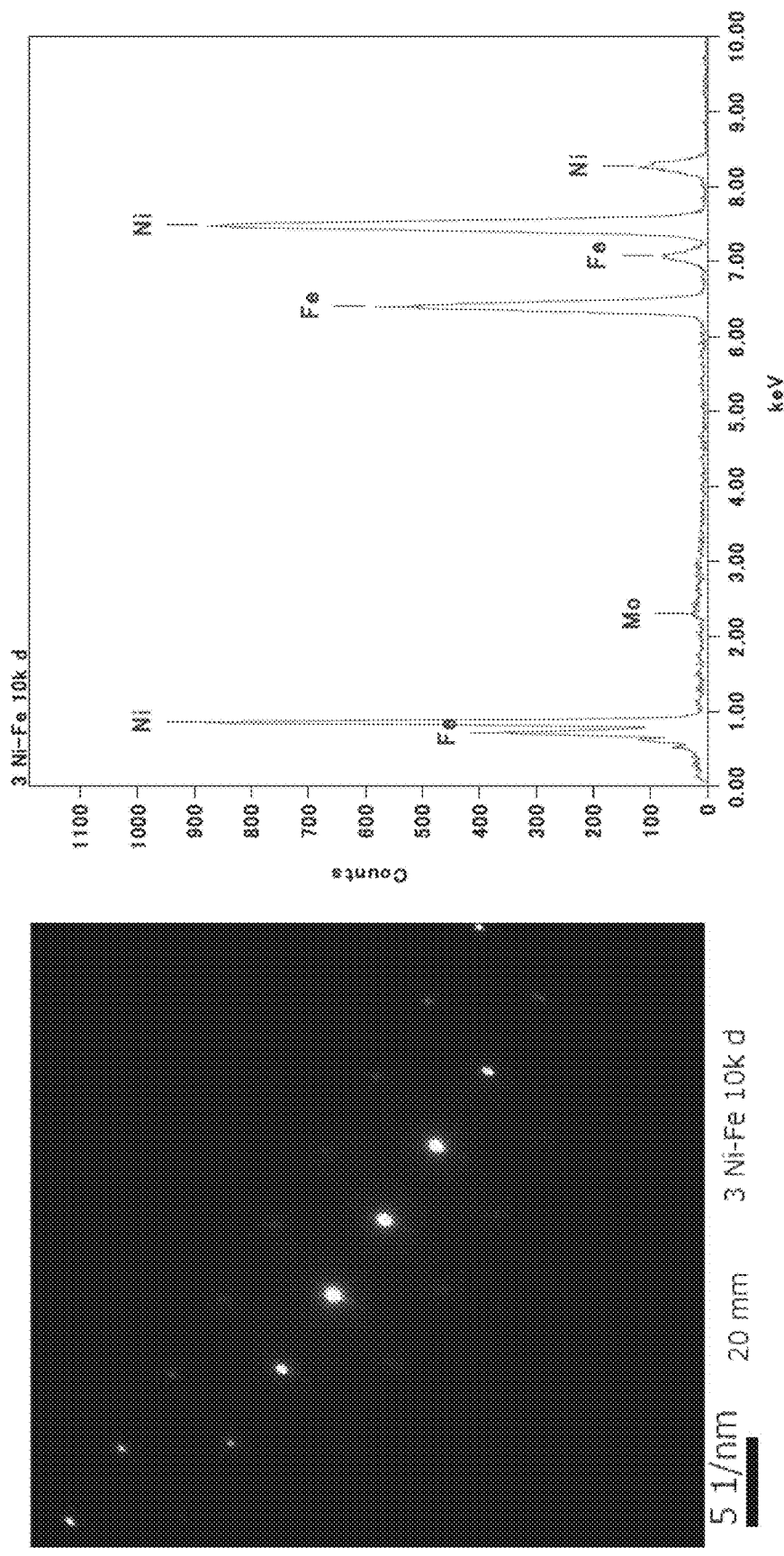

FIG. 4-2a shows the μ-diffraction measurement results and the EDS analysis results of the point a in the visual field B. The EDS analysis results show that the point a in the visual field B includes about 34 atom % of Fe and about 66 atom % of Ni. Further, it is seen from the μ-diffraction measurement that the point a in the visual field B has the fcc structure. Therefore, it was determined that the point a in the visual field B was Taenite.

Figures 2B, 4:
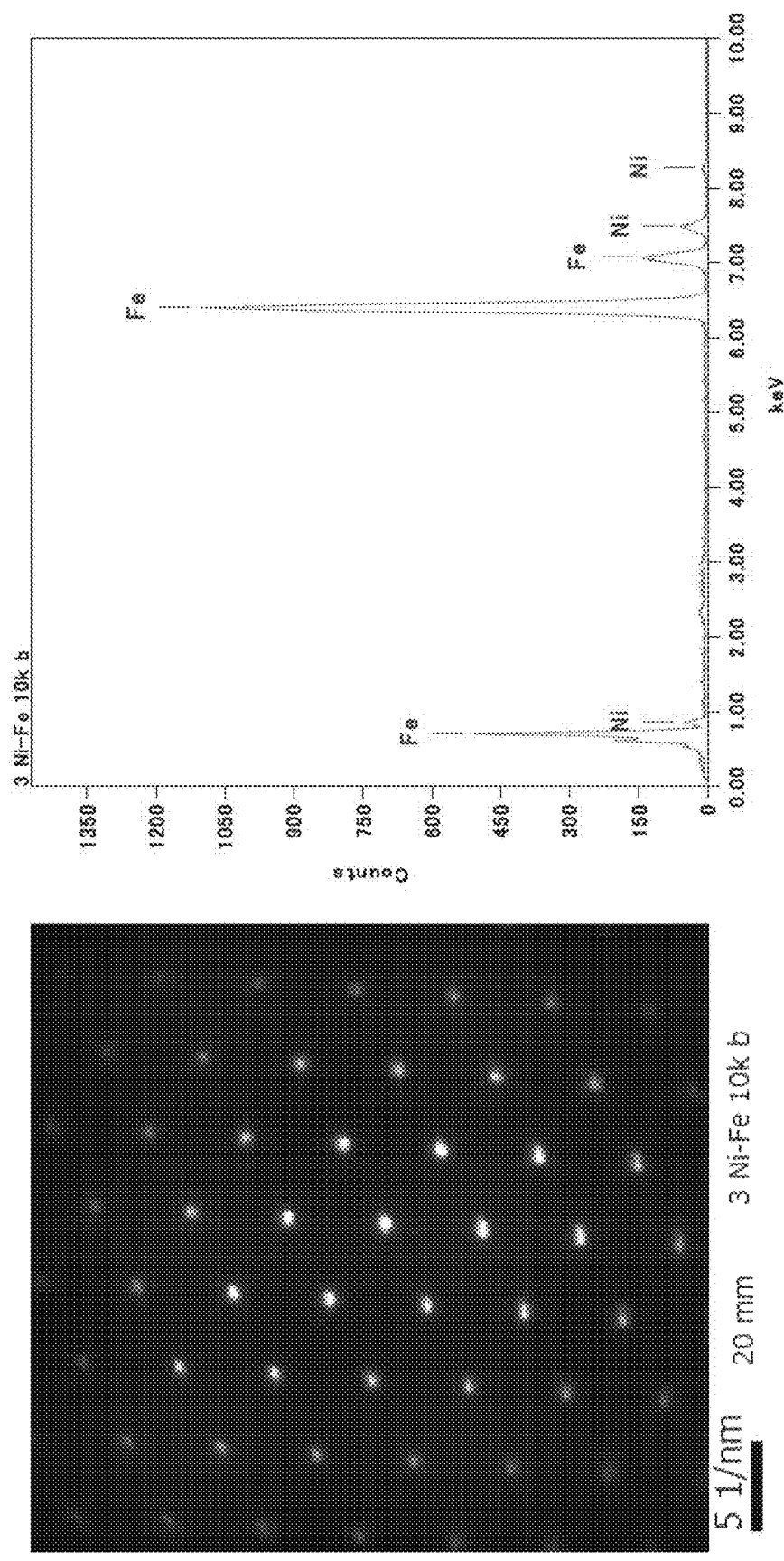

FIG. 4-2b shows the μ-diffraction measurement results and the EDS analysis results of the point b in the visual field B. The EDS analysis results show that the point b in the visual field B includes about 95 atom % of Fe and about 5 atom % of Ni. Further, the μ-diffraction measurement results show that the point b in the visual field B has the bcc structure. Therefore, it was determined that the point b in the visual field B was α-Fe. It was determined that the visual field B also included the mixed phase on the basis of the measurement results.

The other configurations of the Fe—Ni alloy region 13 are not particularly limited. For example, the thickness of the Fe—Ni alloy region 13 is not particularly limited and can be appropriately selected within a normal range. Fe may be diffused to a surface layer in the Ni-based coating layer 12 of the Ni-plated steel sheet 1. In a case in which Fe in the surface layer is 5 mass % or more, the thickness of the Fe—Ni alloy region 13 is considered to be equal to the thickness of the Ni-based coating layer 12. On the other hand, the thickness of the Fe—Ni alloy region 13 may be defined as, for example, 0.2 to 1 μm. It is preferable that the thickness of the Fe—Ni alloy region 13 is 0.2 μm or more. In this case, it is possible to reliably ensure the corrosion resistance of the Ni-plated steel sheet 1. In addition, it is preferable that the thickness of the Fe—Ni alloy region 13 is 1 μm or less. In this case, the workability of the Ni-plated steel sheet 1 is further improved.

(Ni Region 14)

As described above, the Ni-plated steel sheet 1 according to this embodiment may include the Ni region 14 in addition to the Fe—Ni alloy region 13. In general, the Ni region 14 is a region of the Ni plating which is not alloyed with the base steel sheet 11. In the invention, a region that includes less than 5 mass % of Fe and a remainder including 90 mass % or more of Ni is defined as the Ni region 14. In a case in which the Ni-plated steel sheet 1 includes both the Fe—Ni alloy region 13 and the Ni region 14, the Ni region 14 is changed into a soft recrystallized Ni layer by annealing which will be described below. The soft Ni region 14 follows the distortion of the steel sheet at the time of machining, such as press forming, and prevents the base steel sheet 11 from being exposed. Therefore, the Ni region 14 can further improve the workability of the Ni-plated steel sheet 1.

The thickness of the Ni region 14 is not particularly limited and can be appropriately selected within a normal range. In the Ni-based coating layer 12 of the Ni-plated steel sheet 1, Fe may be diffused to the surface layer. In a case in which the surface layer includes 5 mass % or more of Fe, the thickness of the Ni region 14 is considered to be 0 μm. On the other hand, it is preferable that the thickness of the Ni region 14 is 0.8 μm or more from the viewpoint of ensuring the workability of the Ni-plated steel sheet 1. Further, it is considered that the effect of improving the workability by the Ni region 14 is saturated when the thickness of the Ni region 14 is greater than about 6.8 μm. Therefore, it is preferable that the thickness of the Ni region 14 is 6.8 μm or less from the viewpoint of economy.

The thickness of the Fe—Ni alloy region 13 and the Ni region 14 can be measured by analyzing element concentration in the depth direction using, for example, EPMA. It is possible to discriminate a region (that is, the Fe—Ni alloy region 13) that has a Fe content of 5% or more and a remainder having a Ni content of 90% or more, a region (that is, the Ni region 14) that has a Fe content of less than 5% and a remainder having a Ni content of 90% or more, and the other region (that is, the base steel sheet 11) by polishing the cut surface of the Ni-plated steel sheet 1 perpendicular to the rolled surface of the base steel sheet 11 and continuously analyzing components from the surface of the Ni-plated steel sheet 1 toward the base steel sheet 11. The interface of each of the base steel sheet 11, the Fe—Ni alloy region 13, and the Ni region 14 can be specified on the basis of the discrimination result. The distance between the interfaces can be measured to measure the thickness of the Fe—Ni alloy region 13 and the Ni region 14. It is desirable to perform the above-described measurement at five points and to regard the average value of the measured values at each point as the thickness of the Fe—Ni alloy region 13 and the Ni region 14, considering variation. The components of the Fe—Ni alloy region 13 and the Ni region 14 can also be determined by analysis using, for example, EPMA.

(Manufacturing Method)

A method for manufacturing the Ni-plated steel sheet 1 according to this embodiment will be described below. According to this manufacturing method, it is possible to suitably manufacture the Ni-plated steel sheet 1 according to this embodiment. However, it is noted that the Ni-plated steel sheet having the above-mentioned characteristics is regarded as the Ni-plated steel sheet 1 according to this embodiment, regardless of the manufacturing method thereof. That is, the following manufacturing conditions do not limit the range of the Ni-plated steel sheet 1 according to this embodiment.

The method for manufacturing the Ni-plated steel sheet according to this embodiment includes a step of plating the base steel sheet 11 with Ni to obtain a base Ni-plated steel sheet, a step of heating the base Ni-plated steel sheet to a soaking temperature range of 650° C. to 850° C., a step of maintaining the temperature of the base Ni-plated steel sheet in the soaking temperature range for 5 to 120 seconds, and a step of cooling the base Ni-plated steel sheet from 650° C., which is the lower limit of the soaking temperature range, to 345° C. or lower. Here, the "base Ni-plated steel sheet" means a Ni-plated steel sheet that has not been alloyed. Hereinafter, each step will be described in detail.

First, the base steel sheet 11 is plated with Ni to obtain the base Ni-plated steel sheet. Ni plating conditions are not particularly limited. The plating bath component, the current condition, the voltage condition, the Ni coating weight, and the like can be appropriately selected according to the use of the Ni-plated steel sheet 1. The following can be given as an exemplary example of preferable conditions.

Bath used: watt bath
Plating bath components of watt bath:
Nickel sulfate hexahydrate 240 g/L
Nickel chloride hexahydrate 30 g/L
Boric acid 30 g/L
pH: 3.5
Bath temperature: 45° C.
Current density: 1 kA/m$^2$
Electrolysis time: adjusted such that Ni coating weight per one surface is 1.5 to 65 g/m$^2$ Then, the base Ni-plated steel sheet is annealed. Specifically, the base Ni-plated steel sheet is heated to a soaking temperature range of 650° C. to 850° C. and is then maintained for 5 to 120 seconds. The heating and the maintenance of the temperature cause mutual diffusion between the Ni plating and the base steel sheet 11. In a case in which the soaking temperature is too low and the retention time is too short, there is a concern that the mutual diffusion will be insufficient and the Fe—Ni alloy region 13 including the mixed phase will not be formed. On the other hand, in a case in which the soaking temperature is too high and the retention time is too long, the progress of the mutual diffusion is excessive. As a result, Fe is excessively supplied to the Ni-based coating layer and the mass % of Ni is extremely reduced. Therefore, there is a concern that the Fe—Ni alloy region 13 including the desired mixed phase will not be formed. In view of these circumstances, the soaking temperature range and the temperature retention time are within the above-described ranges.

The base Ni-plated steel sheet whose temperature is maintained in the soaking temperature range of 650° C. to 850° C. is cooled from the soaking temperature range to 345° C. or lower. This cooling step is most important to obtain the Fe—Ni alloy region 13 including the mixed phase. A diffusion alloy layer formed between the Ni plating and the base steel sheet 11 in the base Ni-plated steel sheet whose temperature is maintained in the soaking temperature range of 650° C. to 850° C. is mainly composed of the fcc phase. The base Ni-plated steel sheet is cooled from the soaking temperature range to 345° C. or lower at an average cooling rate of 2.5 to 11° C./s in the temperature range of 650° C. to 560° C. and at an average cooling rate of 12° C./s or more in the temperature range of 560° C. to 345° C.

Figures 1, 5:
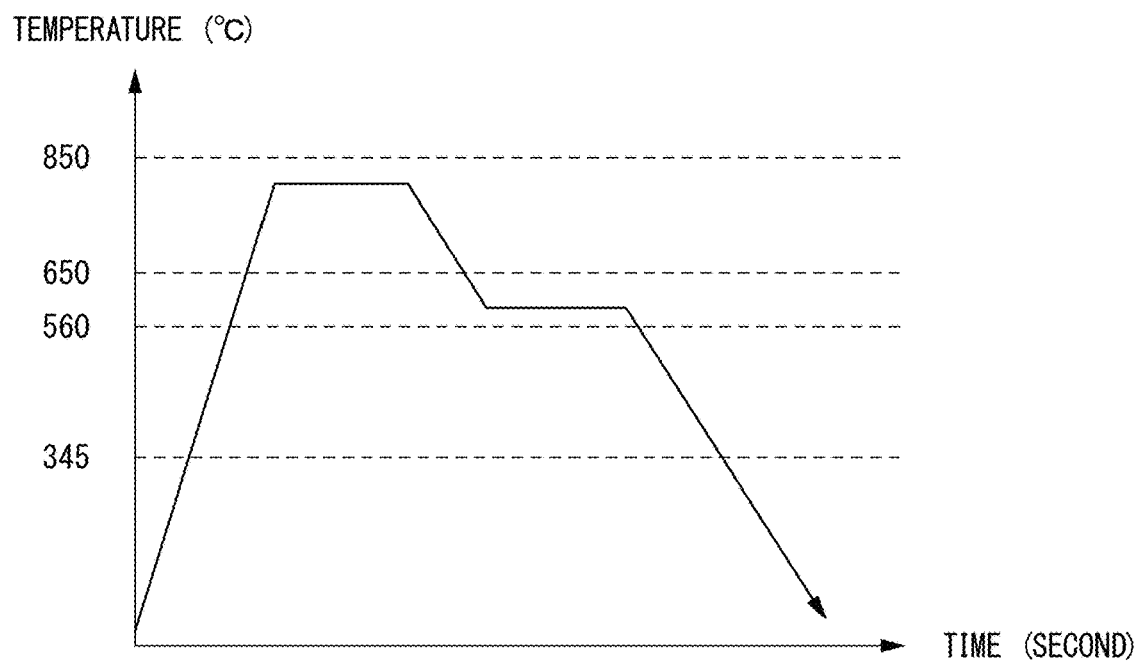
Figures 2, 5:
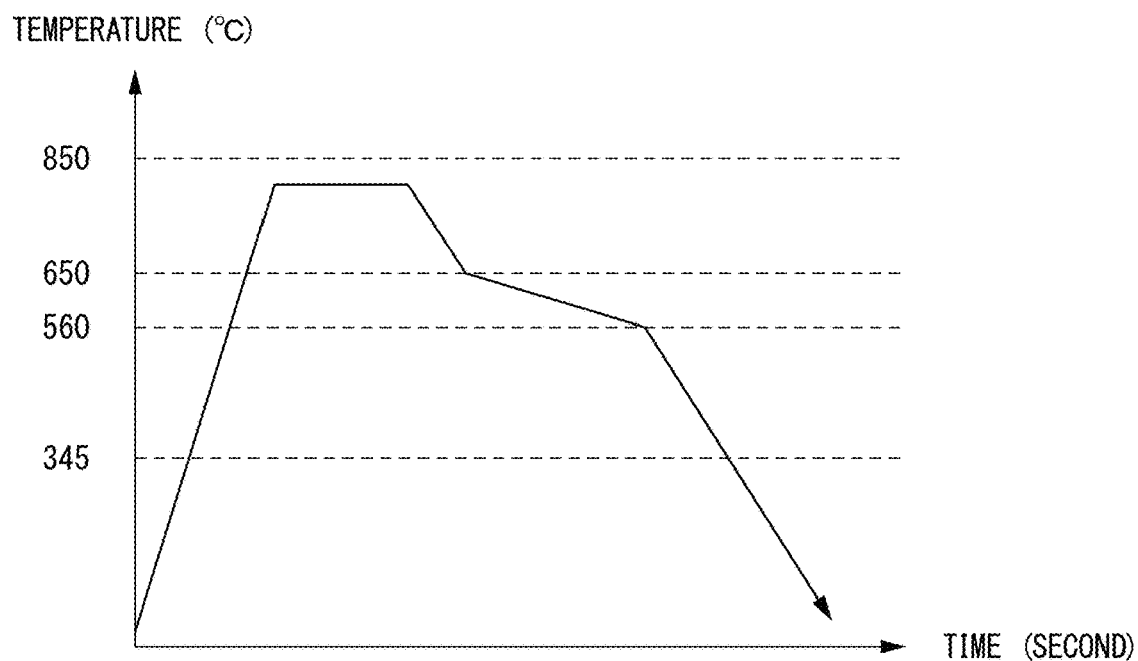

The average cooling rate in the temperature range of 650° C. to 560° C. is a value obtained by dividing a temperature difference from 650° C. to 560° C. (that is, 650° C.−560° C.=90° C.) by the time required for the temperature of the steel sheet to decrease from 650° C. to 560° C. The average cooling rate in the temperature range of 560° C. to 345° C. is a value obtained by dividing the temperature difference from 560° C. to 345° C. (that is, 560° C.−345° C.=215° C.) by the time required for the temperature of the steel sheet to decrease from 560° C. to 345° C. In addition, in the temperature range of 650° C. to 560° C., soaking may be performed as shown in FIG. 5-1, or cooling may be performed at a low cooling rate as shown in FIG. 5-2.

The temperature range of 650° C. to 560° C. is a temperature range in which transformation from the fcc phase to the bcc phase is likely to occur. The target mixed phase composed of the bcc phase and fcc phase is formed by reducing the cooling rate in the temperature range of 650° C. to 560° C. Further, the fcc phase remains and a structure is prevented from becoming the bcc single phase by increasing the cooling rate in the temperature range from 560° C. to 345° C. Furthermore, in general, as the temperature of the steel sheet becomes higher, the cooling rate becomes higher. Therefore, soaking may be performed in the temperature range of 650° C. to 560° C. such that the average cooling rate is 2.5 to 11° C./s.

EXAMPLES

The effects of one aspect of the invention will be described in more detail using examples. However, the conditions in the examples are only one condition example adopted for confirming the feasibility and effects of the invention. The invention is not limited to the one condition example. The invention may adopt various conditions as long as the object of the invention is achieved without departing from the gist of the invention.

Various Ni-plated steel sheets were manufactured under the conditions described below. The base steel sheet 11 was made of Al—K steel (C: 0.057 mass %, Si: 0.004 mass %, Mn: 0.29 mass %, P: 0.014 mass %, S: 0.007 mass %, and a remainder including iron and impurities). The thickness of each steel sheet was 0.3 mm. Ni plating was performed on these base steel sheets 11 while adjusting the electrolysis time such that the Ni coating weight was a predetermined amount in a watt bath (plating bath components: nickel sulfate hexahydrate 240 g/L, nickel chloride hexahydrate 30 g/L, and boric acid 30 g/L, pH: 3.5, bath temperature: 45° C., and current density: 1 kA/m$^2$).

Base Ni-plated steel sheets after the Ni plating were annealed under conditions shown in Table 1. Further, in Table 1, the "soaking temperature retention time" means the time when the temperature of the base Ni-plated steel sheet reaches the soaking temperature and is kept at a constant value.

TABLE 1

| | Ex. No. | Soaking temperature (° C.) | Soaking temperature retention time (sec) | Average cooling rate in the temperature range of 650° C. to 560° C. (° C./sec) | Average cooling rate in the temperature range of 560° C. to 345° C. (° C./sec) | Remarks |
| --- | --- | --- | --- | --- | --- | --- |
| Example | A1 | 750 | 20 | 2.6 | 12 | |
| | A2 | 750 | 20 | 3.9 | 13 | |
| | A3 | 750 | 20 | 6 | 14 | |
| | A4 | 750 | 20 | 7.5 | 15 | |
| | A5 | 750 | 20 | 10 | 16 | |
| | A6 | 750 | 20 | 11 | 18 | |
| | A7 | 650 | 20 | 8 | 15 | |
| | A8 | 700 | 20 | 8 | 15 | |
| | A9 | 800 | 20 | 8 | 15 | |
| | A10 | 830 | 20 | 8 | 15 | |

TABLE 1-continued

|  | Ex. No. | Soaking temperature (° C.) | Soaking temperature retention time (sec) | Average cooling rate in the temperature range of 650° C. to 560° C. (° C./sec) | Average cooling rate in the temperature range of 560° C. to 345° C. (° C./sec) | Remarks |
|---|---|---|---|---|---|---|
|  | A11 | 750 | 5 | 8 | 15 |  |
|  | A12 | 750 | 10 | 8 | 15 |  |
|  | A13 | 750 | 30 | 8 | 15 |  |
|  | A14 | 750 | 60 | 8 | 15 |  |
|  | A15 | 750 | 90 | 8 | 15 |  |
|  | A16 | 750 | 120 | 8 | 15 |  |
|  | A17 | 750 | 20 | 8 | 15 |  |
|  | A18 | 750 | 20 | 8 | 15 |  |
|  | A19 | 750 | 20 | 8 | 15 |  |
|  | A20 | 750 | 20 | 8 | 15 |  |
|  | A21 | 750 | 20 | 8 | 15 |  |
|  | A22 | 750 | 20 | 8 | 15 |  |
|  | A23 | 750 | 20 | 8 | 15 |  |
|  | A24 | 750 | 20 | 8 | 15 |  |
|  | A25 | 750 | 20 | 8 | 15 |  |
| Comparative Example | B1 | 750 | 20 | 13 | 12 |  |
|  | B2 | 750 | 20 | 15 | 15 |  |
|  | B3 | 750 | 20 | 2 | 2 |  |
|  | B4 | 750 | 20 | 1.5 | 1.5 |  |
|  | B5 | 630 | 20 | 7.5 | 15 | — |
|  | B6 | 860 | 20 | 3.9 | 14 |  |
|  | B7 | 750 | 4 | 8 | 15 |  |
|  | B8 | 750 | 185 | 8 | 15 |  |
|  | B9 | 750 | 20 | 2 | 20 | Retained for 30 seconds at 600° C., |
|  | B10 | 750 | 20 | 13 | 15 | Rapidly cooled from 650° C. to 560° C. with 13° C./sec |
|  | B11 | 750 | 20 | 8 | 10 |  |

In addition, the other annealing conditions that are not shown in Table 1 are as follows. The annealing atmosphere was N$_2$-2% H$_2$. The base Ni-plated steel sheet was cooled from the soaking temperature with an in-furnace atmosphere gas, and it was confirmed that the temperature of the steel sheet was 300° C. or lower. Then, the base Ni-plated steel sheet was taken out of the furnace.

Various Ni-plated steel sheets obtained by the above-mentioned way were evaluated as follows. The evaluation results are shown in Table 2.

(1) Confirmation of Presence or Absence of Mixed Phase

First, the Ni coating weight per one surface of the Ni-plated steel sheet 1 is measured. The Ni coating weight was calculated by ICP (which will be described in detail below). Then, the thickness of the Ni-based coating layer 12 was estimated on the basis of the Ni coating weight. Then, the Ni-plated steel sheet 1 was cut perpendicularly to the rolled surface, and the obtained cut surface was polished. This cut surface was observed with a low-magnification SEM. In a case in which the Fe—Ni alloy region 13 could not be clearly identified, the position of the Fe—Ni alloy region 13 was estimated on the basis of the thickness of the Ni-based coating layer 12. Then, a TEM photograph of the Fe—Ni alloy region 13 was taken. The size of the TEM photograph was 1 μm square. Further, μ-diffraction measurement was performed on each crystal grain in order to specify the phase of each crystal grain in the Fe—Ni alloy region 13 identified in the TEM photograph. It was determined whether each crystal grain in the Fe—Ni alloy region 13 had the bcc phase or the fcc phase on the basis of a diffraction pattern. In a case in which the bcc phase and the fcc phase were mixed in one visual field of 1 μm square, it was determined that the mixed phase was formed in the visual field. This measurement was performed in five visual fields. When the mixed phase was formed in one or more visual fields, it was determined that the Fe—Ni alloy region 13 of the Ni-plated steel sheet 1 to be measured included the mixed phase of the bcc phase and the fcc phase.

(2) Measurement of Average Grain Size of Bcc Grains

The average equivalent circle diameter of the bcc grains included in the Fe—Ni alloy region 13 was calculated using EBSP. The measurement visual field in EBSP analysis was 10×30 μm. Further, in the EBSP analysis, α-Fe (bcc) grains having an equivalent circle diameter of 2 μm or more were excluded from the analysis target. The obtained average value of the equivalent circle diameters of the bcc grains included in the Fe—Ni alloy region 13 was regarded as the average grain size of the bcc grains.

(3) Measurement of Ni Coating Weight

The Ni coating weight in the Ni-plated steel sheet 1 was measured by an ICP analysis method. First, the Fe—Ni alloy region 13 and the Ni region 14 having an area of 2500 mm$^2$ (50 mm square) were dissolved with an acid. Then, the total amount of Ni included in a solution was quantitatively analyzed by ICP. The Ni coating weight per unit area was calculated by dividing the total amount of Ni quantified by ICP by the area of the above-mentioned region to be measured.

(4) Measurement of Thickness of Fe—Ni Alloy Region 13 (Alloy Region Thickness) and Thickness of Ni Region 14 (Ni Region Thickness).

The thicknesses of the Fe—Ni alloy region 13 and the Ni region 14 were measured by analyzing element concentration in the depth direction using EPMA. A region (that is, the Fe—Ni alloy region 13) that had a Fe content of 5 mass % or more and a remainder having a Ni content of 90 mass % or more, a region (that is, the Ni region 14) that had a Fe content of less than 5 mass % and a remainder having a Ni content of 90 mass % or more, and the other region (that is, the base steel sheet 11) were discriminated by polishing the cut surface of the Ni-plated steel sheet 1 perpendicular to the rolled surface of the base steel sheet 11 and continuously analyzing components from the surface of the Ni-plated steel sheet 1 toward the base steel sheet 11. The interface of each of the base steel sheet 11, the Fe—Ni alloy region 13, and the Ni region 14 was specified on the basis of the discrimination result. The distance between the interfaces was measured to measure the thicknesses of the Fe—Ni alloy region 13 and the Ni region 14. The above-described measurement was performed at five points, and the average value of the measured values at each point was regarded as the thickness of the Fe—Ni alloy region 13 and the Ni region 14 in consideration of a variation.

(5) Evaluation of Corrosion Resistance of Processed Portion

Processing simulated the forming of a cylindrical can battery. Specifically, a processed product having a reduced sheet thickness was manufactured from each Ni-plated steel sheet 1 by draw bead processing. A pair of dies composed of a convex die and a concave die were used as a draw bead. A material forming the dies is FCD500 and is plated with full hard Cr. The shape of the convex die was a semicircle of 4R, and the shape of the concave die has a recess depth of 6 mm, a recess bottom length of 10 mm, and a shoulder R of 2 mm. A sample was manufactured by shearing each Ni-plated steel sheet 1 to a width of 30 mm, removing burrs from an end surface, and applying low-viscosity oil (NOXRUST550F manufactured by Parker Industries, Inc.). The sample was processed under the conditions of a pressing load of 500 kgf and a drawing speed of 120 mm/sec to obtain a processed product having a sheet thickness reduction rate of 20%.

The processed sample was cut into a shape of 30 mm×60 mm, an end surface was masked with a tape seal, and a surface in contact with the convex die was used as an evaluation surface. Processed portion corrosion resistance was evaluated by a 0.5% NaCl aqueous solution spray test. As evaluation criteria, a case in which red rust was not formed after 8 hours of salt spray was regarded as acceptable, and a case in which red rust was formed was regarded as rejected, which was represented by "Bad (B)" in the table. In the acceptable cases, a case in which red rust was not formed after 8 hours of salt spray and was formed after 16 hours of salt spray was represented by "Good (G)" in the table, a case in which red rust was not formed after 16 hours of salt spray and was formed after 24 hours of salt spray was represented by "Very Good (VG)" in the table, and a case in which no red rust was formed even after 24 hours of salt spray was represented by "Greatly Good (GG)" in the table.

In addition, the processed portion corrosion resistance evaluated by a procedure including the above-mentioned draw bead processing is an index of plastic workability and coating adhesion. In the Ni-plated steel sheet which has high corrosion resistance even after the draw bead processing, the Ni-based coating layer is not damaged by the draw bead processing. In this case, it is determined that the plastic workability and adhesion of the Ni-based coating layer are high.

TABLE 2

| Ex. No. | Presence of mixed phase | Average grain size of bcc grains in mixed phase (nm) | Ni coating weight (g/m$^2$) | Thickness of Ni region (μm) | Thickness of alloy region (μm) | Corrosion resistance of processed portion |
|---|---|---|---|---|---|---|
| A1 | Yes | 380 | 18 | 1.8 | 0.4 | G |
| A2 | Yes | 320 | 18 | 1.8 | 0.4 | G |
| A3 | Yes | 300 | 18 | 1.8 | 0.4 | VG |
| A4 | Yes | 150 | 18 | 1.8 | 0.4 | GG |
| A5 | Yes | 80 | 18 | 1.8 | 0.4 | VG |
| A6 | Yes | 20 | 18 | 1.8 | 0.4 | VG |
| A7 | Yes | 70 | 18 | 2.0 | 0.2 | VG |
| A8 | Yes | 100 | 18 | 1.9 | 0.3 | GG |
| A9 | Yes | 400 | 18 | 1.6 | 0.6 | GG |
| A10 | Yes | 600 | 18 | 1.4 | 0.8 | VG |
| A11 | Yes | 40 | 18 | 2.0 | 0.2 | VG |
| A12 | Yes | 100 | 18 | 1.9 | 0.3 | GG |
| A13 | Yes | 200 | 18 | 1.7 | 0.5 | GG |
| A14 | Yes | 400 | 18 | 1.5 | 0.7 | VG |
| A15 | Yes | 700 | 18 | 1.3 | 0.9 | VG |
| A16 | Yes | 950 | 18 | 1.2 | 1.0 | G |
| A17 | Yes | 100 | 1 | 0.0 | 0.1 | G |
| A18 | Yes | 150 | 1.5 | 0.0 | 0.2 | G |
| A19 | Yes | 160 | 2.4 | 0.0 | 0.3 | G |
| A20 | Yes | 180 | 4.8 | 0.2 | 0.4 | G |
| A21 | Yes | 200 | 8 | 0.6 | 0.4 | VG |
| A22 | Yes | 200 | 12 | 1.1 | 0.4 | VG |
| A23 | Yes | 250 | 24 | 2.6 | 0.4 | GG |
| A24 | Yes | 250 | 32 | 3.6 | 0.4 | GG |
| A25 | Yes | 300 | 63 | 7.0 | 0.4 | GG |
| B1 | No | — | 18 | 1.8 | 0.4 | B |
| B2 | No | — | 18 | 1.8 | 0.4 | B |
| B3 | No | — | 18 | 1.8 | 0.4 | B |
| B4 | No | — | 18 | 1.8 | 0.4 | B |
| B5 | No | — | 18 | 2.1 | 0.15 | B |
| B6 | No | — | 18 | 1.1 | 1.1 | B |
| B7 | No | — | 18 | 2.1 | 0.17 | B |
| B8 | No | — | 18 | 1.0 | 1.2 | B |
| B9 | No | — | 18 | 1.8 | 0.4 | B |

TABLE 2-continued

| Ex. No. | Presence of mixed phase | Average grain size of bcc grains in mixed phase (nm) | Ni coating weight (g/m$^2$) | Thickness of Ni region (μm) | Thickness of alloy region (μm) | Corrosion resistance of processed portion |
|---|---|---|---|---|---|---|
| B10 | No | — | 18 | 1.8 | 0.4 | B |
| B11 | No | — | 18 | 1.8 | 0.4 | B |

As shown in Table 2, it was confirmed that the mixed phase was present in all of the examples. In addition, in the examples, the corrosion resistance of the processed portion was high. Further, in the examples, components of the bcc phase and the fcc phase were measured. As a result, in all of the examples, the bcc phase had a component including 0 to 30 atom % of Ni and a remainder including iron and impurities, and the fcc phase had a component including 20 to 70 atom % of Fe and a remainder including Ni and impurities.

On the other hand, in Comparative Examples B1 to B11, it was not confirmed that the mixed phase was present. In the comparative examples, the corrosion resistance of processed portion was lower than that in the examples.

It is considered that the reason why the mixed phase did not occur in Comparative Examples B1, B2, and B10 was that an average cooling rate in the temperature range of 650° C. to 560° C. was too high and all of the alloy phases were the fcc phase.

It is considered that the reason why the mixed phase did not occur in Comparative Examples B3 and B4 was that the average cooling rate in the temperature range of 650° C. to 560° C. and the average cooling rate in the temperature range of 560° C. to 345° C. were too low and all of the alloy phases were the bcc phases.

It is considered that the reason why the mixed phase did not occur in Comparative Example B5 was that the soaking temperature was too low and alloying was not sufficient.

It is considered that the reason why the mixed phase did not occur in Comparative Example B6 was that the soaking temperature was too high and Fe in the Fe—Ni alloy region was excessive.

It is considered that the reason why the mixed phase did not occur in Comparative Example B7 was that the soaking time was too short and alloying was not sufficient.

It is considered that the reason why the mixed phase did not occur in Comparative Example B8 was that the soaking time was too long and Fe in the Fe—Ni alloy region was excessive.

It is considered that the reason why the mixed phase did not occur in Comparative Example B9 was that the average cooling rate in the temperature range of 650° C. to 560° C. was too low and all of the alloy phases were the bcc phases.

It is considered that the reason why the mixed phase did not occur in Comparative Example B11 was that the average cooling rate in the temperature range of 560° C. to 345° C. was too low, the fcc was transformed into the bcc, and the mixed phase disappeared.

INDUSTRIAL APPLICABILITY

According to the invention, it is possible to provide a Ni-plated steel sheet having high plastic workability, high coating adhesion, and high corrosion resistance and a method for manufacturing the Ni-plated steel sheet. Since the Ni-plated steel sheet contributes to, for example, reducing the size of a battery and increasing the capacity of the battery, it has high industrial applicability.

BRIEF DESCRIPTION OF THE REFERENCE SYMBOLS

1 Ni-plated steel sheet
11 Base steel sheet
12 Ni-based coating layer
13 Fe—Ni alloy region
14 Ni region

What is claimed is:

1. A Ni-plated steel sheet comprising:
a base steel sheet; and
a Ni-based coating layer that is disposed on a surface of the base steel sheet,
wherein the Ni-based coating layer includes a Fe—Ni alloy region that is formed on the surface of the base steel sheet,
the Fe—Ni alloy region includes a mixed phase composed of a bcc phase and an fcc phase, and a component of the Fe—Ni alloy region includes 5 mass % or more of Fe and a remainder including 90 mass % or more of Ni.

2. The Ni-plated steel sheet according to claim 1, wherein the bcc phase includes 0 to 30 atom % of Ni and a remainder including iron and impurities.

3. The Ni-plated steel sheet according to claim 1, wherein the fcc phase includes 20 to 70 atom % of Fe and a remainder including Ni and impurities.

4. The Ni-plated steel sheet according to claim 1, wherein an average grain size of crystal grains having the bcc phase is 10 nm to 1000 nm.

5. The Ni-plated steel sheet according to claim 1, wherein a Ni coating weight per one surface of the Ni-based coating layer is 1.5 to 65 g/m$^2$.

6. The Ni-plated steel sheet according to claim 1, wherein the Fe—Ni alloy region has a thickness of 0.2 to 1 μm.

7. A method for manufacturing the Ni-plated steel sheet according to claim 1, the method comprising:
plating a base steel sheet with Ni to obtain a base Ni-plated steel sheet;
heating the base Ni-plated steel sheet to a soaking temperature range of 650° C. to 850° C.;
maintaining a temperature of the base Ni-plated steel sheet in the soaking temperature range for 5 to 120 seconds; and
cooling the base Ni-plated steel sheet from the soaking temperature range to 345° C. or lower,
wherein, in the cooling, an average cooling rate in a temperature range of 650° C. to 560° C. is 2.5 to 11° C./s, and an average cooling rate in a temperature range of 560° C. to 345° C. is 12° C./s or more.

* * * * *